United States Patent Office 3,652,698
Patented Mar. 28, 1972

3,652,698
DEHYDROGENATION OF ETHYLBENZENE
Roger M. Benslay, Northfield, and Arthur L. Jones, Solon, Ohio, assignors to The Standard Oil Company, Cleveland, Ohio
No Drawing. Filed July 20, 1970, Ser. No. 56,696
Int. Cl. C07c *15/10, 5/18*
U.S. Cl. 260—669
4 Claims

ABSTRACT OF THE DISCLOSURE

Styrene is produced by contacting a mixture of ethylbenzene, air, steam, and optionally hydrogen sulfide or sulfur dioxide with an iron oxide-containing activated carbon at an elevated temperature and recovering the product.

---

The present invention relates to a process for the production of vinyl aromatic compounds by the dehydrogenation of alkylaromatic compounds and more particularly pertains to a process for the dehydrogenation of ethylbenzene to styrene by contacting a mixture of ethylbenzene, air and steam with an activated carbon containing iron oxide at an elevated temperature and recovering the styrene produced thereby.

In the process of this invention a mixture of steam, air, optionally $H_2S$ or $SO_2$ and ethylbenzene is passed over an iron oxide-containing activated carbon, at a temperature in the range of 570° F. to 1250° F. at, below or slightly above atmospheric pressure, and at a contact time in the order of from 0.1 second to 50 seconds, to produce styrene. The process of this invention produces styrene in good yield and conversion over long, continuous operating times with periodic (after about each 300 hours on stream) catalyst regeneration required. The process of this invention has the added advantage of being an exothermic reaction which supplies its own heat of reaction and can be carried out after start-up without the need for any external heat.

The steam used in the present process must be present in at least a 1.5:1 mole ratio of steam to ethylbenzene. Mole ratios above 1.5:1 can be used advantageously, and the upper limit of steam will be governed primarily by the economics of the process. The air used in this process must be present in at least 0.05:1 mole ratio of air to ethylbenzene and preferably a mole ratio of from 0.2:1 to 5:1. The use of very high levels of steam or air will necessarily decrease the level of ethylbenzene employed and the resulting styrene product. The use of excessively high levels of air will result in the burning of some of the activated carbon.

The present invention is advantageously applied in a process or the dehydrogenation of ethylbenzene to form styrene.

The prior art does not disclose the use of an iron oxide-containing activated carbon for the dehydrogenation of ethylbenzene to styrene either in the presence of or in the absence of steam or air. Ethylbenzene has been previously dehydrogenated to styrene catalytically usually in the presence of a catalyst composed of iron oxide promoted with chromium oxide and sometimes promoted with potassium oxide. The product from such prior art processes is usually about a 30 percent conversion of ethylbenzene with about 90 percent selectivity to styrene. The catalysts used in the prior art processes are often expensive to produce and maintain, and the reaction conditions (1000° F.–1200° F.) are much more severe than those employed in the present process. The prior art catalysts usually must be handled carefully because of low mechanical strength and health hazards.

The process of the present invention has many advantages over the prior art processes for converting ethylbenzene to styrene including lower reaction temperatures, lower catalyst cost (the instant catalyst is primarily active carbon), higher conversions (50–60 percent) of ethylbenzene and high selectivity (90–96 percent) to styrene, higher mechanical strength of the catalyst; and the present process is exothermic which means lower reaction costs whereas most prior art processes are endothermic and require an external source of heat.

The instant process can be carried out at temperatures well below 1290° F. for extended periods of time with only a slow decline in catalytic activity of the iron oxide-containing activated carbon. The catalyst can be regenerated to its original activity by heating in the presence of steam and a small amount of air for a short time at an elevated temperature, for instance 1470° F. to 2000° F.

The primary object of the present invention is to provide a dehydrogenation process for producing styrene from ethylbenzene which can function close to equilibrium conditions without suffering from an excessive degree of side reactions or catalyst degradation leading to a decreased efficiency, or cracking which causes formation of by-products and deposition of carbon onto and within the catalyst, thereby shielding the other surfaces and centers thereof from the material being converted.

The active carbon useful in this invention is any form of carbon produced by destructive distillation of wood, peat, lignite, anthracite, nut shells, corn cobs, bones, vegetables, organic polymers, both natural and synthetic, or other carbonaceous matter, including liquid petroleum fractions which contain iron oxide, i.e. $Fe_2O_3$, FeO and other forms, which is activated. Iron oxide is conveniently deposited on activated carbon by impregnating the carbon with an aqueous solution of a soluble iron salt, such as $Fe(NO_3)_3 \cdot 9H_2O$, and drying the thus treated carbon under reduced pressure at an elevated temperature and in the presence of oxygen or air. The iron nitrate is thus converted to the oxide. Small amounts of other metal oxides, such as chromium oxide and potassium oxide, may serve as promoters with the iron oxide in the catalyst and can be included in the catalyst of this invention.

Activation of the carbon, which may be done before the iron oxide is incorporated therein, is achieved by heating the carbon to high temperatures (1290° F. to 1840° F.) with steam, with mixtures of steam and oxygen or with carbon dioxide, as is well known in the art, and in some cases hygroscopic substances, such as zinc chloride and/or phosphoric acid or sodium sulfate, are added prior to the destructive distillation or activation. The carbon content of activated carbon ranges from about 10 percent for bone charcoal to 98 percent for some wood chars. The density of activated carbon useful in this invention can range from 0.08 to 0.6.

This invention is further illustrated in the following examples wherein the amounts of materials are expressed in parts by weight unless otherwise indicated.

EXAMPLE I

A catalyst composed of ferric nitrate impregnated activated carbon was prepared by treating an activated carbon (Nuchar WV–L) with an aqueous solution of

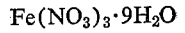

A standard solution of $Fe(NO_3)_3 \cdot 9H_2O$ was prepared by dissolving 378 grams of $Fe(NO_3)_3 \cdot 9H_2O$ in distilled water and diluting the solution to a volume of 500 mls. This is the equivalent of 15 grams of $Fe_2O_3$ per 100 mls. of solution. 33 mls. of this solution were diluted to 200 mls. with distilled water, and this was added to 100 grams of the activated carbon. The mixture was stirred thoroughly and was then allowed to stand at ambient temperature and pressure for several days. The liquid was then removed from the carbon by decantation, the carbon was rinsed once with 200 mls. of distilled water and was then dried under vacuum at 800° F. The catalyst was then ready to use.

In this manner active carbons having 0 percent, 2.5 percent, 4 percent, 5 percent, 7.5 percent, and 10 percent by weight $Fe_2O_3$ on them were prepared.

The reactor was a tube 12 inches long with an internal diameter of ⅞ inch constructed of stainless steel. The $Fe(NO_3)_3$ treated active carbon catalyst (30 g.) was placed in the reactor to a bed depth of 6 inches and the reactor was heated and maintained at reaction temperature by means of a radiant heat electric furnace. The reaction was carried out at substantially atmospheric pressure and temperatures in the range of 572° F. to 1202° F. The ethylbenzene, air and water were introduced at the bottom of the reactor through an inlet tube and the reactants were passed upwards through the heated catalyst bed and at the top of the reactor. The application of air and heat converts the $Fe(NO_3)_3$ on the activated carbon to iron oxides, primarily $Fe_2O_3$. The catalyst was coarse enough not to be carried out the top of the reactor with the effluent gases. The product gases were withdrawn from the top of the reactor through a single line which passed through a water-cooled condenser which caused separation of the steam from the hydrocarbon gases. Periodic analysis of the product gas stream was made by gas chromatography.

The ethylbenzene used was Eastman Kodak "highest purity" grade. Steam rates were measured and controlled by means of a calibrated metering pump for distilled water, and ethylbenzene was also calibrated as liquid by an accurate metering pump. The liquid water and ethylbenzene were vaporized in the feed lines prior to entering the reactor.

The liquids in the effluent from the reactor were condensed and measured in graduated cylinders. The percentage of all components in the product gas stream was determined by gas chromatography. Mass spectrometer analyses were used for confirmation. The conversion represents the percentage of ethylbenzene charged which is converted to other products. The percent selectivity is the percentage of the ethylbenzene converted divided by the fractional weight of the total products.

In this manner an experiment was run at 700° F. in which ethylbenzene was converted to styrene using as feed 200 cc. of air per hour, 14 cc. of liquid water per hour and 6 cc. of liquid ethylbenzene per hour. The hydrocarbon product was composed of 52.64 percent styrene, 45.35 percent ethylbenzene, 1.55 percent benzene and 0.46 percent toluene which represents a total conversion of ethylbenzene of 54.65 percent with a selectivity to styrene of 96.32 percent.

EXAMPLE II

The procedure of Example I was repeated using a reaction temperature of 750° F. The hydrocarbon product was composed of 48.39 percent styrene, 45.62 percent ethylbenzene, 4.31 percent benzene and 1.68 percent toluene which represents a total conversion of ethylbenzene of 54.38 percent with a selectivity of 89.0 percent to styrene.

EXAMPLE III

The procedure of Example II was repeated except that 300 cc. per hour of air was fed to the reactor. The hydrocarbon product was composed of 49.66 percent styrene, 47.35 percent ethylbenzene, 1.89 percent benzene and 1.11 percent toluene, which represents a total conversion of ethylbenzene of 52.65 percent with a selectivity of 94.32 percent to styrene.

EXAMPLE IV

The procedure of Example II was repeated except that 12 cc. per hour of liquid ethylbenzene was used in the feed. The hydrocarbon product was composed of 58.15 percent ethylbenzene, 37.88 percent styrene, 2.94 percent benzene and 1.03 percent toluene which represents a 41.85 percent conversion of ethylbenzene with a 90.50 selectivity to styrene.

EXAMPLE V

Example IV was repeated except that 28 cc. of water per hour were used in the feed. The hydrocarbon product was composed of 56.40 percent ethylbenzene, 39.81 percent styrene, 3.03 percent benzene and 0.76 percent toluene which corresponds to a 43.60 percent total conversion of ethylbenzene with a selectivity of 91.31 percent to styrene.

EXAMPLE VI

The procedure of Example V was repeated except that the reaction temperature was 800° F. The hydrocarobn product was composed of 55.27 percent ethylbenzene, 39.42 percent styrene, 4.08 percent benzene and 1.24 percent toluene which is equivalent to a total conversion of ethylbenzene of 44.73 percent with a selectivity of 88.12 percent to styrene.

EXAMPLE VII

The procedure of Example VI was repeated except that 40 cc. per hour of distilled water were used in the feed. The hydrocarbon product was composed of 57.76 percent ethylbenzene, 38.38 percent styrene, 2.84 percent benzene and 1.02 percent toluene which represents a 42.24 percent conversion of ethylbenzene with a 90.86 percent selectivity to styrene.

EXAMPLE VIII

This example, which is outside the scope of the present invention, illustrates that when air is not used in the feed the conversion of ethylbenzene and selectivity to styrene are drastically reduced.

The procedure of Example VII was repeated except that no air was included in the feed and instead 50 cc. of nitrogen per hour were used in the feed. The hydrocarbon product was composed of 74.23 percent ethylbenzene, 21.87 percent styrene, 2.51 percent benzene and 1.39 percent toluene which represents a total conversion of 25.77 percent of ethylbenzene and a selectivity to styrene of 84.87 percent.

We claim:
1. The process for preparing styrene comprising passing a mixture of ethylbenzene, a molecular oxygen-containing gas and steam over an iron oxide-containing activated carbon at a temperature in the range of 570° F. to 1250° F. at a contact time of from 0.1 second to 50 seconds and recovering the styrene produced.
2. The process of claim 1 wherein the molecular oxygen-containing gas is air.
3. The process of claim 2 wherein steam is present in at least a 1.5:1 mole ratio of steam to ethylbenzene.
4. The process of claim 3 wherein the air is present in at least a 0.05:1 mole ratio of air to ethylbenzene.

References Cited
UNITED STATES PATENTS 3,403,192  9/1968  Vadekar et al. _____ 260—669

CURTIS R. DAVIS, Primary Examiner